US007903871B2

(12) United States Patent
Kaplinsky et al.

(10) Patent No.: US 7,903,871 B2
(45) Date of Patent: Mar. 8, 2011

(54) SYSTEM AND METHOD FOR IMAGE PROCESSING OF MULTI-SENSOR NETWORK CAMERAS

(75) Inventors: Michael Kaplinsky, Sierra Madre, CA (US); Mikhail Korkin, Glendale, CA (US)

(73) Assignee: Arecont Vision, LLC., Glendale, CA (US)

( * ) Notice: Subject to any disclaimer, the term of this patent is extended or adjusted under 35 U.S.C. 154(b) by 593 days.

(21) Appl. No.: 12/099,010

(22) Filed: Apr. 7, 2008

(65) Prior Publication Data

US 2008/0247672 A1 Oct. 9, 2008

Related U.S. Application Data

(60) Provisional application No. 60/922,114, filed on Apr. 5, 2007.

(51) Int. Cl.
*G06K 9/00* (2006.01)

(52) U.S. Cl. .......... 382/162; 382/275; 382/299; 382/300

(58) Field of Classification Search .................. 382/162, 382/275, 299, 300; 348/222.1, 231.6, 241; 358/518, 1.2; 386/278; 375/240.2

See application file for complete search history.

(56) References Cited

U.S. PATENT DOCUMENTS

| 6,978,050 | B2 * | 12/2005 | Hunter et al. ................. 382/275 |
| 7,170,529 | B2 | 1/2007 | Chang |
| 7,200,279 | B1 | 4/2007 | Lin |
| 7,453,498 | B2 * | 11/2008 | Prentice et al. ............ 348/222.1 |

OTHER PUBLICATIONS

International Search Report and Written Opinion for corresponding PCT Application No. PCT/US08/59582, 6 pp.
International Preliminary Examination Report for corresponding PCT Application No. PCT/US08/59582, 5 pp.

* cited by examiner

*Primary Examiner* — Anh Hong Do
(74) *Attorney, Agent, or Firm* — Christie, Parker & Hale LLP

(57) ABSTRACT

An image processing method and system for a multi-sensor network camera. The method and system including generating a plurality of full resolution images in Bayer array format (Bayer images) produced by a plurality of image sensors; interpolating a plurality of low resolution Bayer images from the full resolution Bayer images during the readout of the full resolution images from the sensors, storing the full resolution Bayer images and the interpolated low resolution images in a plurality of buffer memories, respectively and without demosaicing the full resolution Bayer images, during the readout of the full resolution Bayer images from the image sensors, by respective plurality of pre-processors; demosaicing the plurality of low resolution Bayer images to generate a corresponding plurality of low resolution demosaiced images, by an image post processor; and transmitting the plurality of low resolution demosaiced images over a computer network to a user for viewing.

18 Claims, 3 Drawing Sheets

Block Diagram of Multi-Sensor Panoramic Network Camera

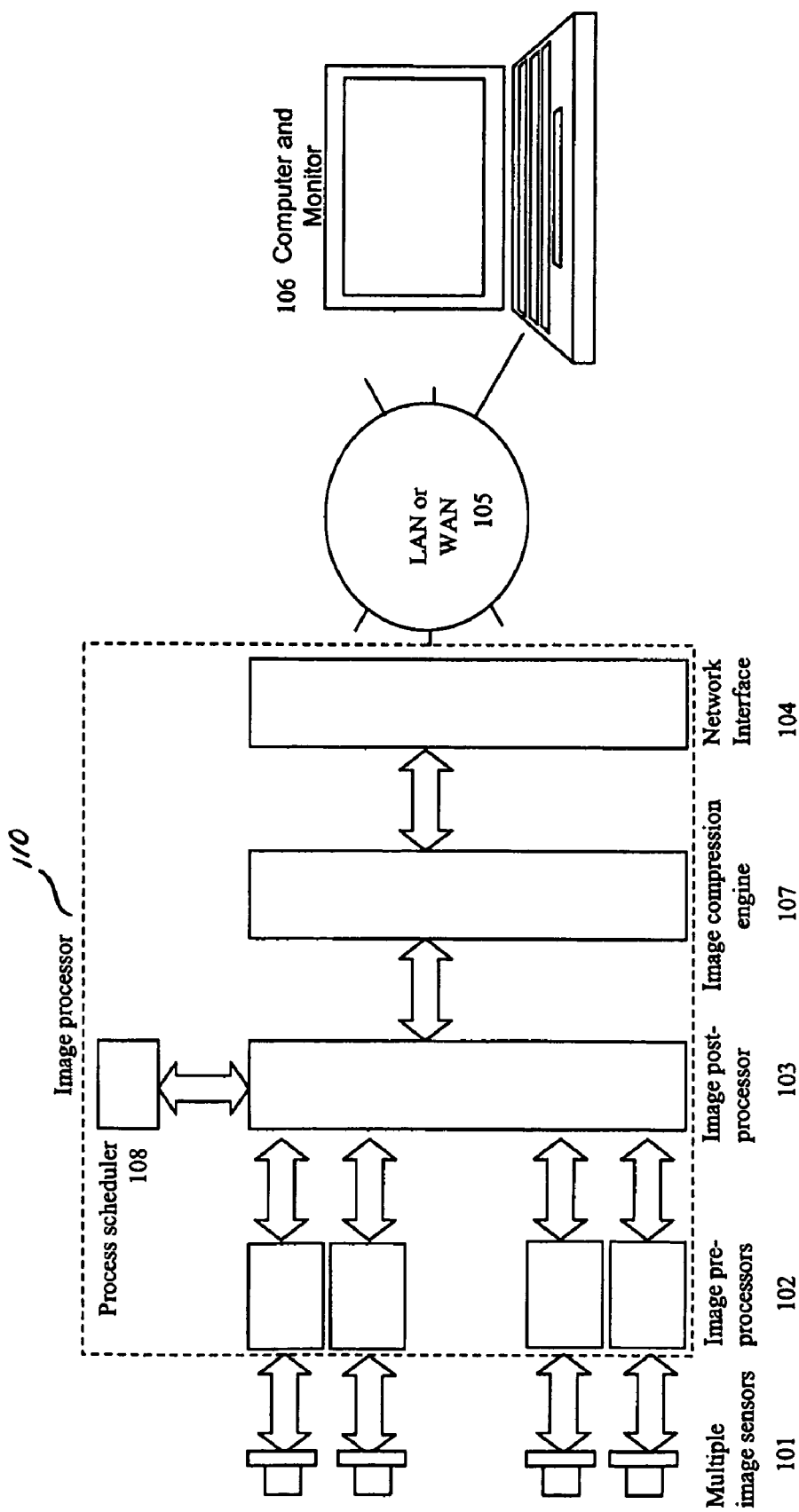
Figure 1. Block diagram of Panoramic Network Camera System

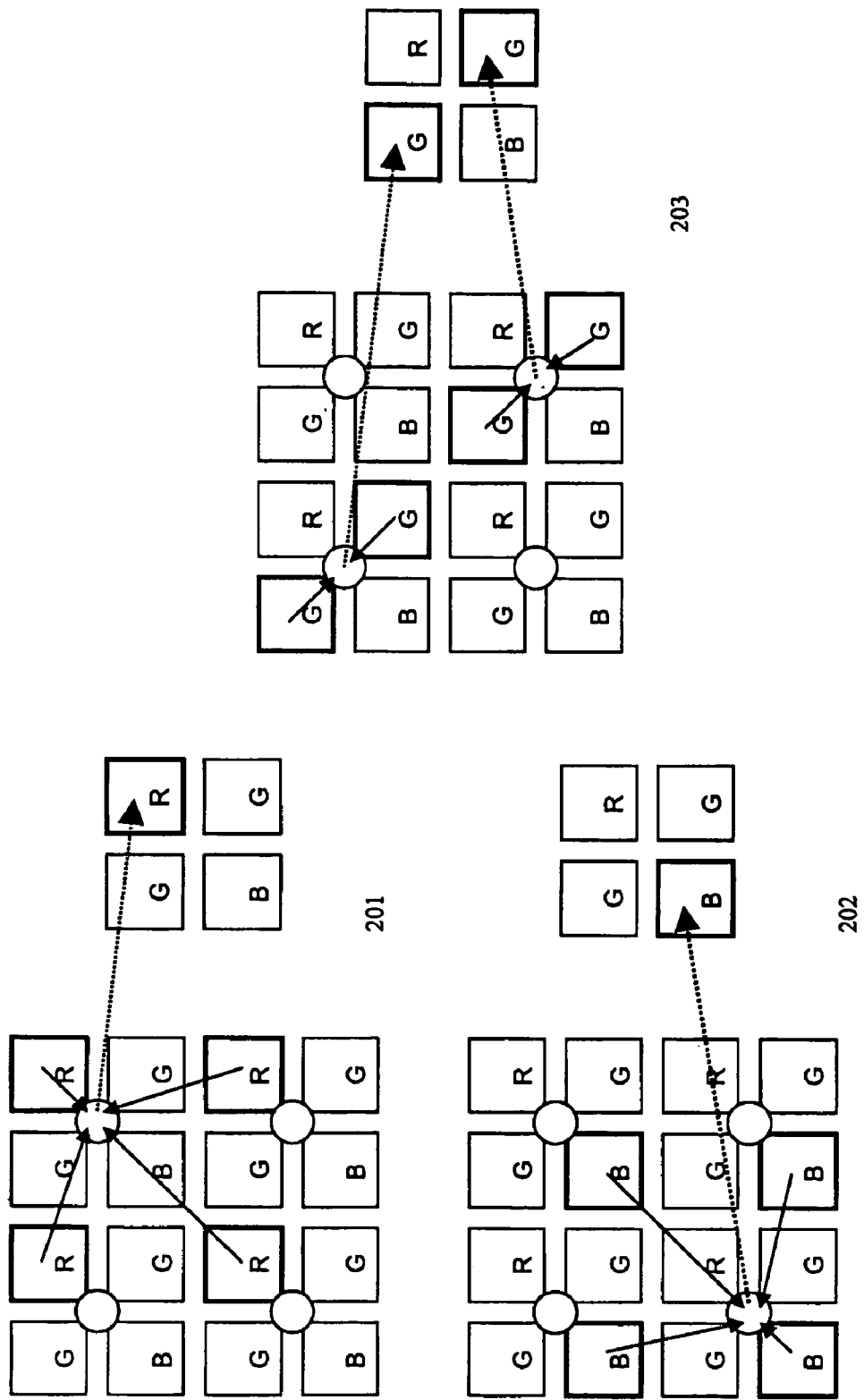
Figure 2. Block Diagram of the Bayer Array Decimation.

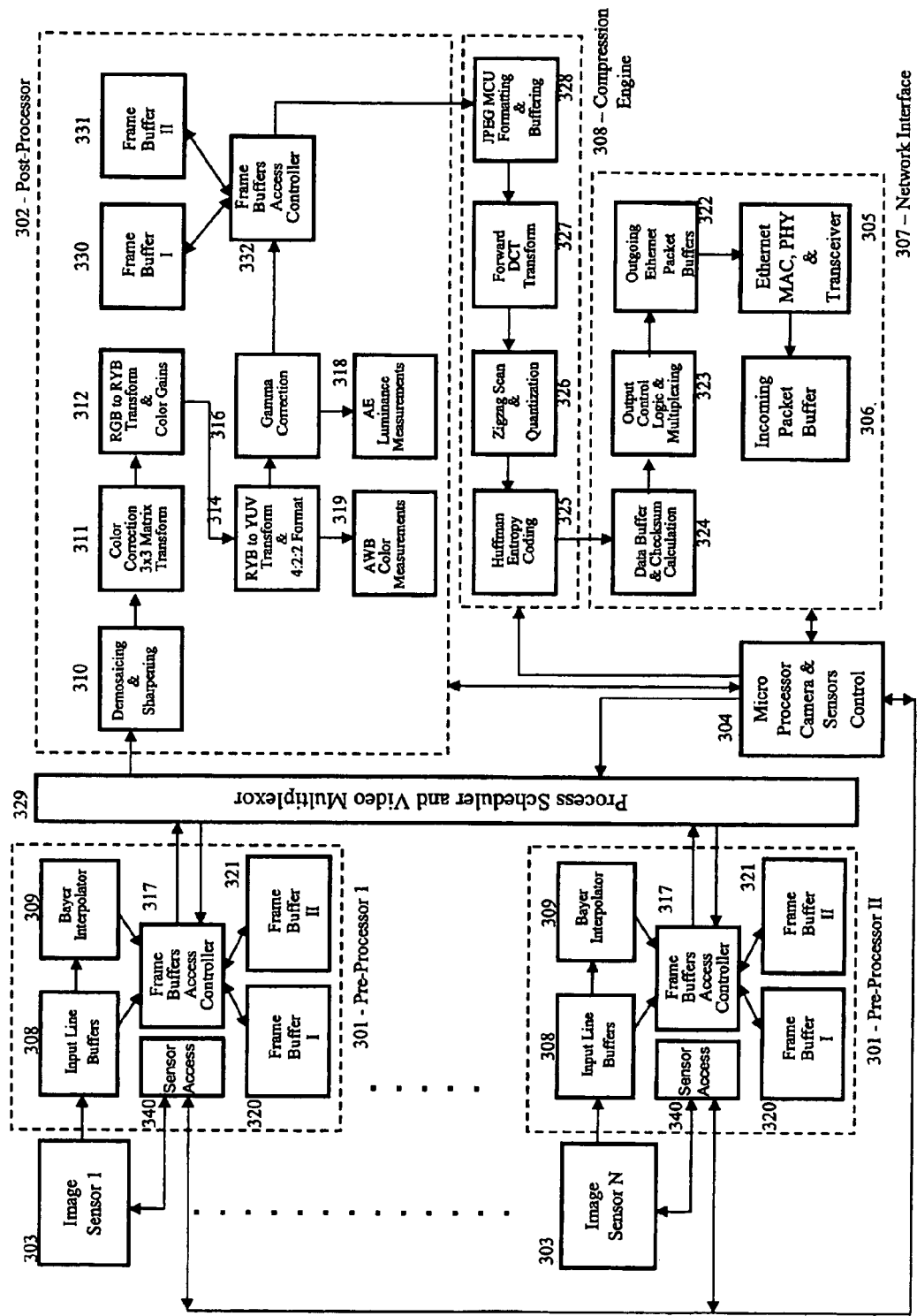
Figure 3 Block Diagram of Multi-Sensor Panoramic Network Camera

SYSTEM AND METHOD FOR IMAGE PROCESSING OF MULTI-SENSOR NETWORK CAMERAS

CROSS-REFERENCE TO RELATED APPLICATION(S)

This Patent Application claims the benefit of the filing date of U.S. Provisional Patent Application Ser. No. 60/922,114, filed on Apr. 5, 2007 and entitled "Image Processor For Multi-Sensor Panoramic Network Camera," the entire content of which is hereby expressly incorporated by reference. This Patent Application is also related to co-pending U.S. patent application Ser. No. 10/890,911, and entitled "Dual Spectral Band Network Camera."

FIELD OF THE INVENTION

The present invention relates generally to image processing; and more particularly to a system and method for image processing of multi-sensor network cameras.

BACKGROUND

Typically, a network camera is required to be able to provide both full and low image resolution at full field of view at the request of the user. Conventionally, the low resolution image is produced from the full resolution image received from the sensor by first converting the raw image from its Bayer array format as produced by the sensor where only one of the three color components R, G, B is available for each pixel while the two other color components are entirely missing, into a different data format via demosaicing where each pixel has a complete color representation, and only then interpolating these pixels to produce a reduced resolution image.

A demosaicing algorithm is a digital image process used to interpolate a complete image from the partial raw data received from a color-filtered image sensor (via a color filter array). A typical way the pixel filters are arranged is to alternating values of Red (R) and Green (G) for odd rows and alternating values of Green (G) and Blue (B) for even rows. Since each pixel of the sensor is behind a color filter, the output is an array of pixel values, each indicating a raw intensity of one of three primary colors. Therefore, a demosaicing process is needed to estimate the color levels for all color components for each pixel.

Moreover, the conversion from full resolution Bayer array to the final low resolution image conventionally comprises multiple related image processing steps, such as sharpening, noise filtering, and color correction. Alternatively, a low resolution Bayer array image may be produced by the image sensor itself if it is equipped with means of skipping certain rows and columns, or binning the values of certain rows and columns when reading out the image. However, image distortion in the low resolution images produced from such skipped or binned Bayer arrays is higher than in the interpolated images produced from the full resolution Bayer arrays after the demosaicing and other image processing steps as described above.

SUMMARY

In some embodiments, the present invention is an image processing method for a multi-sensor network camera. The method includes: generating a plurality of full resolution images in Bayer array format (Bayer images) produced by a plurality of image sensors; interpolating a plurality of low resolution Bayer images from the full resolution Bayer images, respectively and without demosaicing the full resolution Bayer images, by respective plurality of pre-processors during the readout of the full resolution Bayer images from the sensors; storing the full resolution Bayer images and the resultant interpolated low resolution Bayer images in a plurality of buffer memories, respectively demosaicing the plurality of low resolution Bayer images to generate a corresponding plurality of demosaiced low resolution images. Optionally, the method can demosaice the plurality of full resolution images to generate a plurality of demosaiced full resolution images, by an image post processor, based on a user request. The method then transmits the plurality of demosaiced low resolution images (or full resolution images) over a computer network (to a user) for viewing.

In some embodiments, the present invention is an image processor for a multi sensor camera. The image processor includes a plurality of pre-processors, each of the plurality of pre-processors corresponding to an image sensor of a plurality of image sensors. Each pre-processor includes: a frame buffer for storing a full resolution Bayer image from a corresponding image sensor and a low resolution Bayer image interpolated from the full resolution Bayer image, the full resolution and low resolution Bayer images having a plurality of red pixels, green pixels and blue pixels, and an interpolator for interpolating the full resolution Bayer image during readout from the sensors and generating the low resolution Bayer image from each of red, green, and blue colors. The image processor further includes an image post processor coupled to the plurality of pre-processors for image processing of the low resolution Bayer image to generate a low resolution image; a process scheduler for scheduling asynchronous image frames from the plurality of pre-processors to be processed by the image post processor; and a network interface for transmitting the processed image over a computer network. The interpolator is configured to generate each red pixel of the low resolution image array from a linear weighted sum of four red neighbor full resolution pixels, generate each blue pixel of the low resolution image array from a linear weighted sum of four blue neighbor full resolution pixels, and generate each green pixel of the low resolution image array from a linear weighted sum of two green neighbor full resolution pixels.

BRIEF DESCRIPTION OF DRAWINGS

FIG. 1 is an exemplary system block diagram of a panoramic network camera system, according to some embodiments of the present invention;

FIG. 2 depicts an exemplary process for a Bayer Array interpolation, according to some embodiments of the present invention; and FIG. 3 is an exemplary block diagram of image processing in a multi-sensor panoramic network camera, according to some embodiments of the present invention.

DETAILED DESCRIPTION

The present invention is a system and method for image processing of a multi-sensor network camera providing up to 360 degrees angle of view. The image processor, according to some embodiments of the present invention, comprises multiple individual image pre-processors, one for each of the multiple image sensors, each sensor equipped with individual optics, one or more shared image post-processors, one process scheduler, one or more shared image compression units and network interfaces, mounted in a single housing. In some embodiments, multiple video streams originating from multiple sensors share the same image post-processor, image compression and network interface hardware, providing for low cost implementation. In some embodiments, multiple image pre-processors independently control their corresponding image sensors to adapt the sensors to individual variations of the available light, causing asynchronous frame capturing and frame rate variation among the sensors.

The video frames asynchronously arriving from multiple sensors are processed in the first-come-first-served order to provide for low image latency and high channel bandwidth utilization. In one embodiment, the video frames are processed in the earliest-deadline-first order to provide for low video frame aging. In yet another embodiment, the frame processing order is round-robin to equalize the opportunity for each of the sensors to transmit video. In yet another embodiment, the processing order is round-robin-with-waiting to equalize the outgoing video frame rate for all sensors of the panoramic camera. In some embodiments of the present invention, the low resolution video stream achieved by image interpolation to reduce camera bandwidth may be dynamically modified by inserting a full resolution video frame, or a full resolution region of interest, from one or more sensors to be used for video archival and display at the same or a slower rate.

In some embodiments, the present invention includes a computer on the receiving end of the network interface and connected to the computer monitor, where the computer runs image processing and acquisition software configured to produce composite panoramic image by performing an image "stitching" process. The image "stitching" process eliminates image overlaps and assembles a composite panoramic image from images taken by different sensors of the panoramic camera.

FIG. 1 is an exemplary system block diagram of a panoramic network camera system, according to some embodiments of the present invention. Image processor 110 includes two or more image sensors with individual optics 101, one or more individual image pre-processors 102 for each of the image sensors, where the pre-processors may control image sensors and comprise one or more video frame buffers for temporary image storage, one or more image post-processors 103 common to all image sensors, where the image post-processors may provide noise filtering, sharpening, and color processing, process scheduler 108 to control the order of processing of the individual video frames arriving from multiple image sensors, image compression engine 107 to reduce the volume of video data, network interface for transmission of the images off camera 104. Image compression engine 107 is capable of compressing the processed image in a variety of known compression techniques.

In some embodiments, the shared image compression engine 107 common to all image sensors 103 performs image compression, where the image compression is configured to compress images arriving from one of the image sensors in the order determined by the process scheduler 108. In some embodiments, shared image compression engine is equipped to transfer the compressed video stream to the network interface 104 of the camera.

In some embodiments, the image sensors 101 are high-resolution CMOS image sensors. In some embodiments, the individual image pre-processors 102 comprise video frame buffers that store raw full resolution image data in Bayer array format as it is produced by the sensors 101 In some embodiments, the sensors have Bayer filters (e.g., blobs of transparent color ink) to produce the Bayer array, during the readout of the images. In some embodiments of the multi-sensor camera, the demosaicing of the Bayer array is performed in the post-processor 103 common to all image sensors, as opposed to performing the demosaicing in each of the multiple pre-processors 102. Consequently, when the user requests a low resolution image from one or more of the multiple sensors, the full resolution data has to be first transferred from one or more of the sensors 101 to their respective pre-processors 102, then to the post-processor 103 to produce the low resolution image. As a consequence, the camera's frame rate when transmitting low resolution images from one or more of the multiple sensors is the same as for full resolution images while it could be potentially increased in proportion to the reduction of the number of pixels in the low resolution image relative to the high resolution image.

In order to provide for a higher frame rate when transmitting low resolution images, instead of first transferring the full resolution image from a pre-processor 102 to the post-processor 103, then converting the Bayer array into a demosaiced format to interpolate a low resolution image, a low resolution Bayer array is directly interpolated from the full resolution Bayer array by each pre-processor 102 during the readout of the raw full resolution data from the sensors 101 into the frame buffers. Then, the low resolution Bayer arrays are stored in the same frame buffers as the full resolution Bayer arrays. Further, the low resolution Bayer arrays are then transmitted to the post-processor 103 when the user requests low resolution images, while the full resolution image arrays are transmitted to the post-processor when the user requests full resolution images.

A Bayer array is typically a color filter array for arranging RGB color filters on a square grid of photosensors. The pattern of a Bayer array is 50% green, 25% red and 25% blue. Each pixel in Bayer array is missing two-thirds of the color data, because each pixel is filtered to record only one of three colors. A typical Bayer array is described in U.S. Pat. No. 3,971,065, the entire contents of which are hereby expressly incorporated by reference.

FIG. 2 shows an exemplary low distortion process for a Bayer array interpolation, according to some embodiments of the present invention An interpolation process produces the low resolution Bayer arrays from the full resolution Bayer arrays for each of the three color pixels: red 201, green 203, and blue 202. In some embodiments, each red pixel of the low resolution Bayer array is the linear weighted sum of four red neighbor full resolution pixels, each blue pixel of the low resolution Bayer array is the linear weighted sum of four blue neighbor full resolution pixels, and each green pixel of the low resolution Bayer array is the linear weighted sum of two green neighbor full resolution pixels.

The circles in FIG. 2 represent positions of low resolution pixels when superimposed onto full resolution array pixels shown as squares. Interpolation reproduces the core "unit" of Bayer pattern of 2×2 pixels: GR on top and BG underneath. To produce the low resolution "unit" of 2×2 low resolution pixels, the process operates on a full resolution array of 2×2 "units" of 2×2 pixels each. In some embodiments, the interpolation is made from the full resolution pixels of one color that are the closest to the center of the low resolution pixel of the same color. In some embodiments, the interpolation weight of the full resolution pixels is proportional to the geometric distance between the geometrical center of the full resolution pixel to the center of the corresponding low resolution pixel, weights shown in FIG. 2 as solid arrows originating at the centers of full resolution array and terminating at the center of the low resolution array. These closest full resolution pixels from which the interpolation is made are shown as bold squares in FIG. 2. In one embodiment, the closest full resolution red or blue pixel has a weight of 0.44888, the farthest has a weight of 0.149627, while the two remaining equidistant pixels have an identical weight of 0.2007, so that the sum of all four weights equals to 1. In the same embodiment, the weights for two green pixels used for interpolation of each low resolution green pixel are identical, and equal to 0.5.

In some embodiments, during the interpolation process, the image pre-processors 102 produce the low resolution Bayer array during the readout of the full resolution array from the sensor, and then store two Bayer arrays corresponding to the full resolution and the low resolution images in the memory buffers, to be further processed by the shared image post-processor common to all image sensors 103 in the order determined by the process scheduler 108.

FIG. 3 is an exemplary block diagram of a multi-sensor panoramic network camera, according to some embodiments of the present invention. In some embodiments of the present invention, the multi-sensor panoramic network camera comprises multiple image sensors 303, image buffer memories (320, 321, 330, and 331), network interface 307, and an Application Specific Integrated Circuit (ASIC) and/or Field Programmable Gate Arrays (FPGAs) operating under control of microprocessor 304. The ASIC or FPGAs implement image pre-processors 301 and post-processors 302 in the form of massively parallel image processing pipeline executing time-critical operations on image pixels. The flow of image pixels is operated on by the sequential stages of the pipeline with each pipeline stage operating in parallel with all or many of the other pipeline stages. The microprocessor 304 controls the operation of the image processing pipeline, performs image pipeline and network initialization operations, relatively slow operations (performed on a once-per-frame basis) associated with auto exposure, white balance, image stream multiplexing and protocol-level network interface computations as well as, maintains the register space constituting the user interface to the camera.

In some embodiments of the present invention, the output of each image sensor is processed by an individual image pre-processor. In some embodiments, the image pre-processors 301 are implemented as image processing pipelines that comprise multiple line memory buffers 308 for 2-dimensional image processing, Bayer interpolators 309 for interpolation of the raw full resolution image (Bayer pixel array) into a low resolution image (Bayer pixel array), at least 2 frame buffers 320 and 321 with associated buffer access controller 317 for ping-pong buffering of the incoming video frames for storing both raw and interpolated images, and a sensor access controller 340 to provide bidirectional communication between the microprocessor 304 and the individual sensors 303. In some embodiments, the sensor access controller establishes independent sensor control according to the commands from the microprocessor 304 to adapt the sensor to individual variations of available light, causing asynchronous frame capturing and frame rate variation from sensor to sensor.

In some embodiments, the process scheduler 329 is equipped to determine the current state of video frame processing by each image pre-processor 301 by checking from time to time whether the frame pre-processing has completed, and request video frames from any of the individual buffer access controllers 317 in the order established by the microprocessor 304, the order may include, but not limited to: first-come-first-served to reduce image latency and maximize bandwidth utilization, earliest-deadline-first to minimize frame aging, round-robin to equalize the opportunity for each sensor to transmit video frames, and round-robin with waiting to equalize the frame rate for all sensors. The process scheduler is also equipped with video multiplexor to transfer video frames from the individual pre-processors to the post-processor 302, one at a time.

In some embodiments, the image post-processor 302 comprises a pipeline which includes: circuit 310 implementing demosaicing and image sharpening, and low-light signal-to-noise ratio improvement by applying high-pass and low-pass filters to the image, a color corrector 311 implementing the multiplication of the resultant RGB pixel components, for example, by a 3×3 color correction matrix, an RGB-to-YUV transformer (312 and 314), a gamma corrector 316 (for example, implemented as a look-up table), an Auto Exposure (AE) 318, and Auto White Balance (AWB) 319 measurement engines that collect image brightness and color statistics required for implementing AE and AWB algorithms, at least 2 frame buffers (330 and 331), and an associated buffer access controller 332 for ping-pong buffering of the processed and incoming frames.

In some embodiments, image post-processor 302 hands over the post-processed images to a pipelined JPEG image compression engine 308, which includes: a circuit 328 to perform macroblock unit (MCU) formation and buffering, Forward Discrete Cosine Transform (FDCT) 327, zigzag scan and quantization 326 and entropy coding 325. In the some embodiments of the present invention, a 2-dimensional FDCT is implemented as a dual-pass 1-Dimensional FDCT transform, utilizing the fact that FDCT is a separable transformation.

In yet other embodiments of the present invention, a more efficient image compression, such as JPEG2000, MPEG-2, MPEG-4, or H.264 may be substituted for baseline JPEG implementation, or added to the baseline JPEG implementation.

In some embodiments, a modified version of Trivial File Transfer Protocol (TFTP) is implemented as the primary mode of image transmission, where TFTP headers are formed and recorded in the transmit packet buffers 322 by the microprocessor 304, data fields of the TFTP packets, i.e. image data, along with the corresponding checksums are formed by the output stages of network interface 307 by means of output control logic 323 while the checksum is computed by means of checksum calculation 324.

In some embodiments, subsequent to image compression, the image stream is stored in one of the three network packet buffers, the buffers arranged in such a way, that one buffer contains the packet currently being transmitted to the Media Access Control (MAC) Ethernet interface 305, one buffer contains a packet to be transmitted next, and one buffer is available for storage of the compressed data coming out of the image compression pipeline. This triple-buffered arrangement guarantees that there is always a packet available for transmission, thus maximizing utilization of available network bandwidth and facilitating re-transmission in the event of network errors. In some embodiments, the microprocessor interfaced with the image processing pipeline and Ethernet MAC and PHY hardware is also used to support a number of network protocols.

In some embodiments, to reduce the overall complexity of implementation, a minimal set of protocols including UDP, TFTP, ARP, IP, and ICMP protocols are supported. In another embodiment of the present invention TCP/IP and DHCP protocols are also supported. In yet another embodiment where MPEG4 or H.264 compression is implemented, an RTSP protocol for real-time streaming is supported.

Referring back to FIG. 1, in some embodiments, the present invention includes a computer on the receiving end of the network interface and connected to the computer monitor 106, where the computer runs image processing and acquisition software configured to produce composite panoramic image by performing an image "stitching" process. The image stitching process eliminates image overlaps and assembles a composite panoramic image from images taken by multiple sensors of the panoramic camera.

In some embodiments, images from individual sensors of the panoramic camera are transmitted over the network in low resolution mode. In some embodiments, panoramic network camera is equipped to output both low resolution and full resolution images and portions of images (windows or regions of interest). In some embodiments, the computer software is also configured to display on the monitor full resolution image or portion of the image to allow for real time electronic zooming and inspection of the details of the panoramic image.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. An image processing method for a multi-sensor network camera, the method comprising:
   generating a plurality of full resolution images in Bayer array format (Bayer images) by a plurality of image sensors, respectively;
   interpolating a plurality of low resolution Bayer images from the full resolution Bayer images, respectively and without demosaicing the full resolution Bayer images, by respective plurality of pre-processors, during readout of the full resolution Bayer images from the plurality of image sensors;
   storing the full resolution Bayer images and the low resolution Bayer images, in a plurality of buffer memories, respectively;
   demosaicing the plurality of low resolution Bayer images to generate a corresponding plurality of low resolution demosaiced images, by an image post processor; and
   transmitting the plurality of low resolution demosaiced images over a computer network for viewing.

2. The method of claim 1, further comprising compressing the plurality of low resolution images, before transmission.

3. The method of claim 1, further comprising sharpening the plurality of low resolution images, before transmission.

4. The method of claim 1, further comprising improving low-light signal-to-noise ratio of the plurality of low resolution images, before transmission.

5. The method of claim 1, further comprising color correcting and gamma correcting the plurality of low resolution images, before transmission.

6. The method of claim 1, further comprising demosaicing the high resolution Bayer images to generate high resolution demosaiced images, and transmitting said high resolution demosaiced images over the computer network for viewing.

7. An image processing method comprising:
   generating a full resolution image in Bayer array format (Bayer image) produced by an image sensor;
   generating a low resolution Bayer image from interpolating the full resolution Bayer image during the readout of the full resolution Bayer image from the image sensor, without demosaicing the full resolution Bayer image;
   demosaicing the low resolution Bayer image to generate a low resolution demosaiced image;
   storing the full resolution Bayer image and the low resolution Bayer image, in a plurality of buffer memories, respectively; and
   transmitting the low resolution demosaiced image for viewing.

8. The method of claim 7, further comprising compressing the low resolution image, before transmission.

9. The method of claim 7, further comprising sharpening the low resolution image, before transmission.

10. The method of claim 7, further comprising improving low-light signal-to-noise ratio of the low resolution image, before transmission.

11. The method of claim 7, further comprising color correcting and gamma correcting the low resolution image, before transmission.

12. The method of claim 7, further comprising demosaicing the high resolution Bayer image to generate a high resolution demosaiced image, and transmitting said high resolution demosaiced image over the computer network for viewing.

13. An image processor for a multi sensor camera comprising:
   a plurality of pre-processors, each of the plurality of pre-processors corresponding to an image sensor of a plurality of image sensors, wherein each pre-processor comprises:
      a frame buffer for storing a full resolution Bayer image from a corresponding image sensor and a low resolution Bayer image interpolated from the full resolution Bayer image, the full resolution and low resolution Bayer images having a plurality of red pixels, green pixels and blue pixels, and
      an interpolator for interpolating the full resolution Bayer image during readout from the sensors and generating the low resolution Bayer image from each of red, green, and blue colors;
   an image post processor coupled to the plurality of pre-processors for image processing of the low resolution Bayer image to generate a low resolution image;
   a process scheduler for scheduling asynchronous image frames from the plurality of pre-processors to be processed by the image post processor; and
   a network interface for transmitting the processed image over a computer network, wherein the interpolator is configured to generate each red pixel of the low resolution image array from a linear weighted sum of four red neighbor full resolution pixels, generate each blue pixel of the low resolution image array from a linear weighted sum of four blue neighbor full resolution pixels, and generate each green pixel of the low resolution image array from a linear weighted sum of two green neighbor full resolution pixels.

14. The image processor of claim 13, further comprising an image compression engine for compressing the processed image before transmission over the computer network.

15. The image processor of claim 13, wherein the interpolator is configured to interpolate the full resolution Bayer image, without demosaicing the full resolution Bayer image.

16. The image processor of claim 13, further comprising: a high-pass filter and a low-pass filter for sharpening and improving low-light signal-to-noise ratio of the low resolution image, before transmission.

17. The image processor of claim 13, wherein each pre-processor further comprises a second frame buffer and a buffer access controller for ping-pong buffering of a respective full resolution Bayer image.

18. The image processor of claim 13, wherein the process scheduler is configured to schedule said asynchronous image frames according to one or more of the group consisting of first-come-first-served order, earliest-deadline-first order, round-robin order, and round-robin-with-waiting order.

* * * * *